(12) United States Patent
Rittman et al.

(10) Patent No.: US 11,302,032 B1
(45) Date of Patent: Apr. 12, 2022

(54) SYSTEMS AND METHODS OF REAL-TIME MOVEMENT, POSITION DETECTION, AND IMAGING

(71) Applicant: GBT Technologies Inc., Santa Monica, CA (US)

(72) Inventors: Danny Rittman, San Diego, CA (US); Mo Jacob, Beverly Hills, CA (US)

(73) Assignee: GBT Technologies, Inc., Santa Monica, CA (US)

( * ) Notice: Subject to any disclaimer, the term of this patent is extended or adjusted under 35 U.S.C. 154(b) by 0 days.

(21) Appl. No.: 17/471,213

(22) Filed: Sep. 10, 2021

Related U.S. Application Data

(60) Provisional application No. 63/211,573, filed on Jun. 17, 2021.

(51) Int. Cl.
| | |
|---|---|
| *G06T 7/00* | (2017.01) |
| *G06T 7/73* | (2017.01) |
| *G06N 3/04* | (2006.01) |
| *G01S 13/931* | (2020.01) |

(52) U.S. Cl.
CPC .............. *G06T 7/75* (2017.01); *G01S 13/931* (2013.01); *G06N 3/04* (2013.01); *G06T 2207/20081* (2013.01); *G06T 2207/20084* (2013.01)

(58) Field of Classification Search
CPC .............. G06T 7/75; G06T 2207/20081; G06T 2207/20084; G01S 13/931; G06N 3/04
See application file for complete search history.

(56) References Cited

U.S. PATENT DOCUMENTS

| | | | |
|---|---|---|---|
| 8,810,388 B2 | 8/2014 | Jacobs et al. | |
| 9,002,372 B2 | 4/2015 | Shakespeare et al. | |
| 9,037,194 B2 | 5/2015 | Rosenbaum | |
| 9,549,691 B2 | 1/2017 | Tran | |
| 9,689,955 B2 | 6/2017 | Rosenbaum | |
| 9,753,131 B2 | 9/2017 | Adib et al. | |
| 2020/0307646 A1* | 10/2020 | Kato .................... | B60K 28/06 |
| 2021/0190913 A1* | 6/2021 | Vasanthakumaribabu .................. | |
| | | | G06N 5/04 |

FOREIGN PATENT DOCUMENTS

WO   WO2013/126964 A1 *   9/2013   .............. G01S 7/35

\* cited by examiner

*Primary Examiner* — Ping Y Hsieh
(74) *Attorney, Agent, or Firm* — Eric L. Lane; Green Patent Law

(57) ABSTRACT

Multi-planar detection and imaging systems and methods are provided. The system has a radio device, at least one antenna, and a processing system in communication with the radio device. The radio device includes at least one receiver and a first transmitter transmitting radio waves in multiple planes. The antenna transmits the radio waves in multiple frequencies. A second transmitter transmits a carrier radio wave guiding the radio waves such that the radio waves identify points of interest in an object or living entity and reflect back to the radio device. The receiver receives the reflected radio waves, and the processing system analyzes the points of interest and constructs an image of the object or living entity. An AI engine including a recurrent neural network may be provided, and the recurrent neural network controls transmission of the radio waves. The AI engine analyzes the points of interest, predicts relationships between the points of interest, and constructs an image of the object or living entity.

20 Claims, 20 Drawing Sheets

SYSTEMS AND METHODS OF REAL-TIME MOVEMENT, POSITION DETECTION, AND IMAGING

CROSS-REFERENCE TO RELATED APPLICATION

This application is a non-provisional of and claims priority to U.S. Patent Application Ser. No. 63/211,573, filed Jun. 17, 2021, which is hereby incorporated by reference herein in its entirety.

FIELD

The present disclosure relates to systems and methods for real-time movement, position detection, and imaging using wireless and artificial intelligence. The present disclosure is directed to systems and methods for location and movement detection of objects and living entities.

BACKGROUND

Movement and location systems based on infra-red and ultrasonic technologies have become advanced over the last decade using neural networks for deep learning and vast data processing. Such systems are used for military and security applications and enable groundbreaking methods for a wide variety of essential functions like airman rescue systems, non-GPS, long range location and movement detection, and similar. Wireless systems for caregiving, baby breathing monitoring, or personal tracking are emerging as artificial intelligence capabilities are getting advanced. Yet many of these systems suffer a lack of accuracy, range, and data processing limitations.

In addition, statistics show that more than 90% of road accidents are caused by driver error (European survey—European New Car Assessment Program (Euro NCAP). Human errors can occur due to driver fatigue, distraction, inattentiveness, intoxication, inexperience, or sudden medical incapacitation, with tragic consequences. Using the vehicle camera's data is risky due to information accuracy and other conditions like heat, fogginess inside the car, objects that interrupt the video, and similar that may cause unreliable information.

Accordingly, there is a need for a movement and location system and method to detect objects' and living entities' location and movement within close spaces like buildings and open spaces including unique mediums like underground and underwater. There is also a need for systems and methods that can track humans and objects for movements and/or health vitals without wearing any electronic devices. There is a need for a system that can effectively detect impaired or distracted driving, provide audible and visual alerts, or in extreme cases, take control of the vehicle.

SUMMARY

The present disclosure, in its many embodiments, alleviates to a great extent the disadvantages and problems associated with known movement, position detection, and location systems by providing systems and methods using multi-planar RF technology, artificial intelligence (AI) and recurrent neural networks (RNN) to detect objects and living entities, location, and movement in real-time. Embodiments of the disclosure include wireless technology that radiates radio waves and measures the reflections. The detection can be in outdoors/indoors environments, underground, underwater, in air, and space.

Disclosed systems and methods can detect objects' and living entities' location and movement within close spaces like buildings and open spaces including unique mediums like underground, underwater, or on an airplane. Another possible application is autonomous vehicles on the ground, air, and sea. Objects and living entities can be moving or static within any type of medium, for example, people inside a vehicle or inside a building.

Disclosed systems and methods include wireless apparatus, antennas, and artificial intelligence processes. Exemplary embodiments provide information regarding the movement of targets as well as their position and shape. In addition, the systems and methods provide real-time imaging of static or movement in 2D/3D graphics. Disclosed systems and methods are useful for health care, for example, elderly caregiving, security, for example, intruder detection, or military for aircraft or submarine detection. Exemplary embodiments can track humans and objects for movements and/or health vitals (BP, SPO2, Heart rate, Temperature).

Embodiments described herein offer a smart mobility method and system (electronics and software) for all types of vehicles, enabling driver status monitoring. They can also monitor all other vehicle passengers, but the driver is the most important one by nature. Disclosed systems use radio waves to constantly monitor and assess the driver's physical and mental health condition reliably and accurately. Based on this data, the system can take action to maintain safety. The radio reflected signals are fed into an AI engine that analyzes the driver's face, breathing rhythm, heart rate, eyes status, and sweating and can determine if he/she is in appropriate condition to control a vehicle. Adding the driver's vital information (heart rate, breathing, sweating) allows the system to quickly determine dangerous situations and take action if necessary. Thus, disclosed systems and methods can reduce driver errors caused by sudden medical conditions, distraction, fatigue, or emotional issues. The system ensures driver readiness and attentiveness to safe travel.

An exemplary embodiment of a multi-planar detection and imaging system comprises a radio device, at least one antenna, and a processing system in communication with the radio device. The radio device includes at least one receiver and a first transmitter transmitting radio waves in multiple planes. The antenna transmits the radio waves in multiple frequencies. A second transmitter transmits a carrier radio wave guiding the radio waves such that the radio waves identify points of interest in an object or living entity and reflect back to the radio device. The receiver receives the reflected radio waves, and the processing system analyzes the points of interest and constructs an image of the object or living entity. The image may be a holographic image or a computer image.

In exemplary embodiments, the processing system includes an artificial intelligence (AI) engine including a recurrent neural network (RNN) in communication with the radio device, and the recurrent neural network controls transmission of the radio waves. The AI engine may be configured to predict relationships between the points of interest and may map the object or living entity and construct an image of the object or living entity. In exemplary embodiments, the recurrent neural network controls transmission of the carrier radio wave. The system may also include at least one repeater configured to extend a range of the radio waves.

In exemplary embodiments, the processing system detects changes in organs of the living entity. The processing system may measure one or more vital signs of the living entity. The system may be configured to be installed in a vehicle being controlled by a driver and configured to take control of the vehicle if the system detects changes in one or more vital signs of the driver or emotional state of the driver or that the driver is falling asleep.

An exemplary multi-planar detection and imaging system comprises a radio device, an AI engine, and at least one antenna. The radio device includes at least one receiver and a first transmitter transmitting radio waves in multiple planes. The antenna transmits the radio waves in multiple frequencies. The AI engine includes a recurrent neural network in communication with the radio device, and the recurrent neural network controls transmission of the radio waves. A second transmitter transmits a carrier radio wave guiding the radio waves such that the radio waves scan an area, identify points of interest in an object or living entity, and reflect back to the radio device. The AI engine analyzes the points of interest, predicts relationships between the points of interest, and constructs an image of the object or living entity.

In exemplary embodiments, the AI engine includes an interest point detector analyzing the points of interest and assigning an orientation to one or more of the points of interest. The interest point detector may be vision-based. The AI engine may mark vertices corresponding to the points of interest and determine whether the points of interest are in an object or a living entity. In exemplary embodiments, the AI engine converts the vertices into shadows and fills in the shadows to construct an image of the object or living entity. The AI engine may construct a vectorial point map of the scanned area based on the reflected radio waves. In exemplary embodiments, the recurrent neural network constructs a thermal map of the scanned area. Exemplary systems may also include a computer screen, and the system identifies dynamic changes in the vectorial point map and presents the dynamic changes as video of the scanned area on the computer screen.

Exemplary embodiments include a method of real-time position and movement detection and imaging comprising transmitting radio waves in multiple planes and in multiple frequencies from a source to an area to be scanned, transmitting a carrier radio wave steering the radio waves such that the radio waves scan an area, identify points of interest in an object or living entity in the scanned area, and reflect back to the source, analyzing the points of interest and predicting relationships between the points of interest, constructing a vectorial point map of the scanned area, and constructing an image of the object or living entity. Exemplary methods further comprise detecting changes in organs of the living entity and measuring one or more vital signs of the living entity. Exemplary methods further comprise identifying dynamic changes in the vectorial point map and presenting the dynamic changes as video of the scanned area on a computer screen.

Disclosed embodiments are fast and robust for detecting, identifying, and localizing human body parts and objects' in-depth images based on the radio waves' reflections. The output of the system can be used directly to reconstruct human gestures. It also can be used as preprocessing for additional processes, such as full-body tracking and movement simulation. Processes described herein are designed specifically for the fast generation of object or living entities' movements in high frame rates, based on the radio data action-reaction cycle. The inventors have been inspired by the insight that geodesic distances on a surface mesh are largely invariant to mesh deformations and/or rigid transformations. For example, the distance from the left hand of a person to the right hand along the body surface is relatively unaffected by her/his posture.

Disclosed systems and methods provide the ability to "see" objects and living entities as holographic images, including their movements. In addition, they identify shape, object's parts, geographic location with or without GPS data, and distance to that object(s). The reading, comparing, identifying, and determining processes described herein can identify objects' and living entities' elevation, geographical location, with GPS or without, using radio triangulation methods. The systems and methods can measure living entities' vital signs. For example, a human's BP, SPO2, body temperature, blood sugar, heart rate, and breathing rhythm may be measured. In addition, the system can detect emotional conditions like stress.

Disclosed systems and methods are useful for healthcare wearable-less vital monitoring, emergency detection (e.g., fall, baby's irregular breathing, irregular heartbeat, and similar), and alert in case of abnormalities. Another application for such a system is in the security domain, to alert for intruders, suspicious activities movements based, and similar. The system can provide a wireless "vision" through any type of medium, for example underground, underwater, on-air and outer space. It works in an indoor and outdoor environment. It also can be used for medical purposes to "see" inside a human's body. Possible applications are searching for clogged arteries, examining tissues for foreign objects, scan skeletal structures and bones, and similar.

Accordingly, it is seen that systems and methods of multi-planar detection and imaging are provided. These and other features of the disclosed embodiments will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

Figure 1:
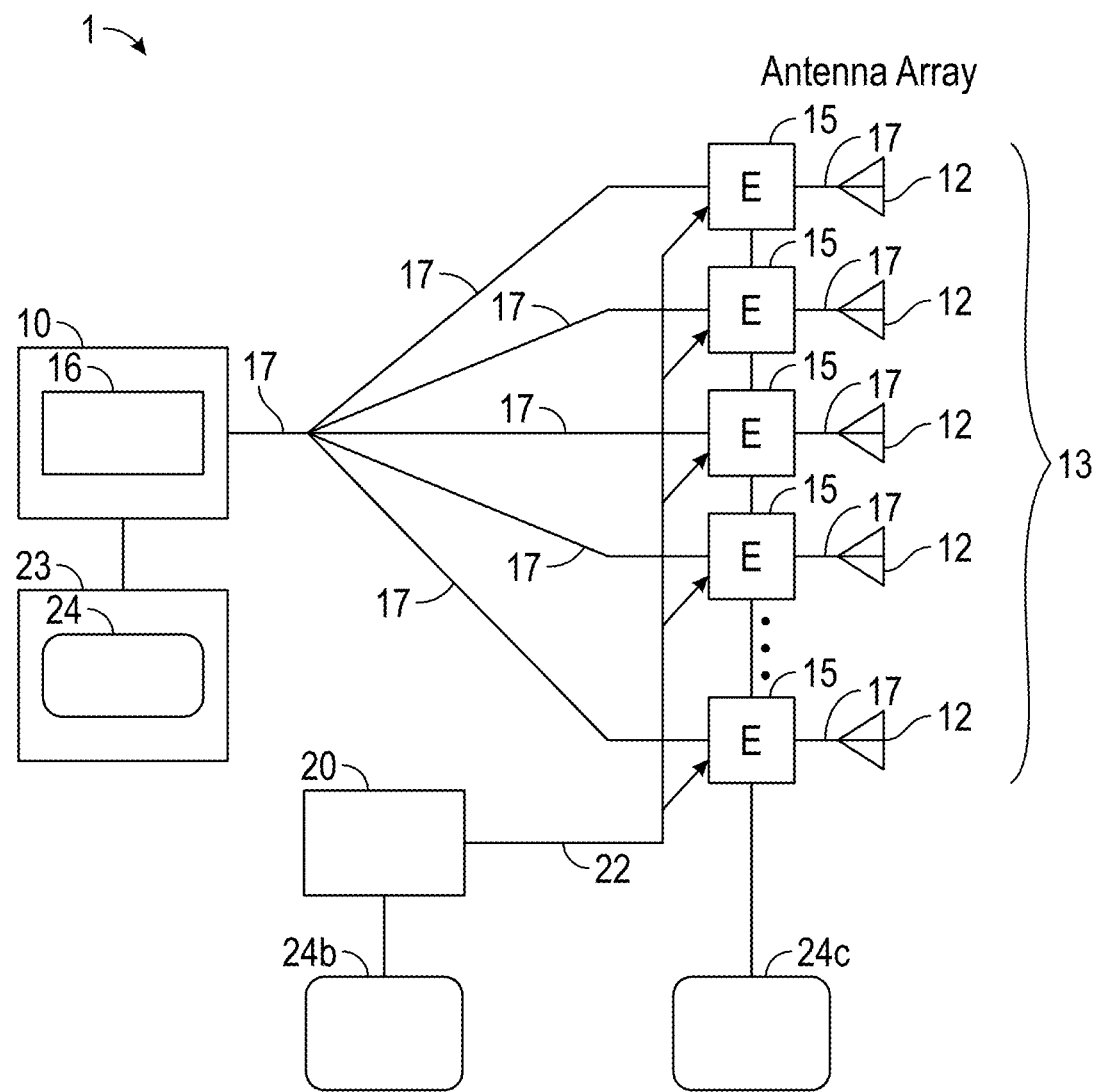
FIG. 1 is a schematic of an exemplary embodiment of a multi-planar detection and imaging system in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects. Reference to materials, configurations, directions, and other parameters should be considered as representative and illustrative of the capabilities of exemplary embodiments, and embodiments can operate with a wide variety of such parameters. It should be noted that the figures do not show every piece of equipment, nor the materials, configurations, and directions of the various circuits and communications systems.

Exemplary embodiments include systems and methods of multi-planar detection and imaging comprised of a wireless system that emits radio waves, which strike objects and/or living entities, and measures the reflected waves. The transmission is enabled by a proprietary, multiplanar system and method to send radio waves, guided by a carrier wave, to create scattered energy. The transmission is done on different planes in the X, Y, and Z-axis. In this way, a robust, high-resolution image of objects and living entities, e.g., people, animals, can be reproduced.

Some of the electromagnetic radiation is transmitted in a pre-defined pattern. This is done to receive predictive reflections that will be analyzed. The reflected energy is measured for its vectorial characteristics and analyzed by a trained recurrent neural network (RNN). Transmitting in the multiplane method produces much higher resolution of the energy beams and therefore enables real-time 3D imaging of moving objects or living entities, e.g., a holographic image of a running person or a moving car. Due to the vectorial imaging nature the RNN can rapidly construct images of objects and/or living entities for further classification and categorization. This type of imaging is mainly done for speed reasons. Holographic images can be performed rapidly, which is a key factor with pattern and image recognition and identification.

Referring to FIGS. 1-6, an exemplary multi-planar detection and imaging system 1 comprises a radio system or device 10, one or more antennas 12, and a processor or processing system 14. The system 1 includes an AI engine 23 to analyze the vast amount of data collected by the system and may include a radio control unit 11. The radio device 10 may include a mechanical apparatus to transmit in the multi-planar method. In exemplary embodiments, a first transmitter 16 is provided to send the radio wave transmissions 17, and one or more receivers 18 to receive the signals reflected back to the radio device 10.

Figure 5:
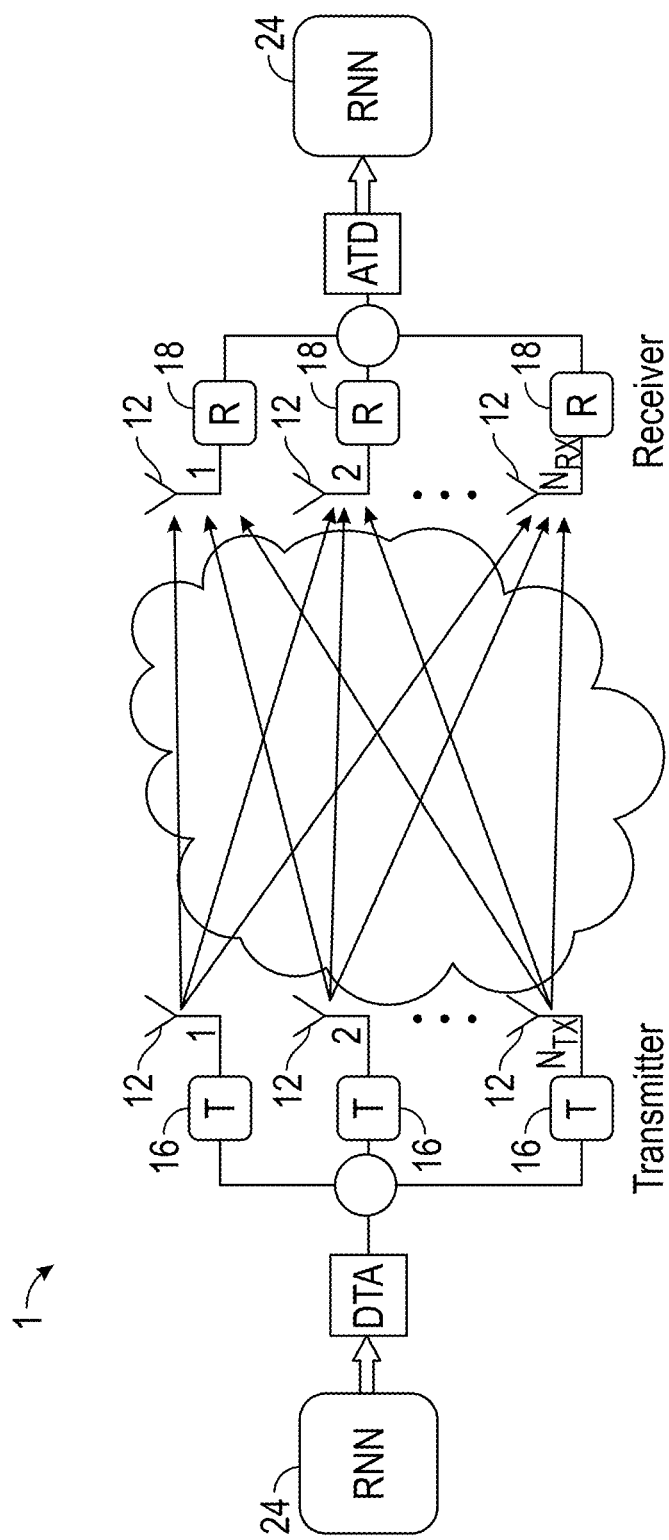
FIG. 5 is a schematic of an exemplary embodiment of a multi-planar detection and imaging system in accordance with the present disclosure.
Figure 6:
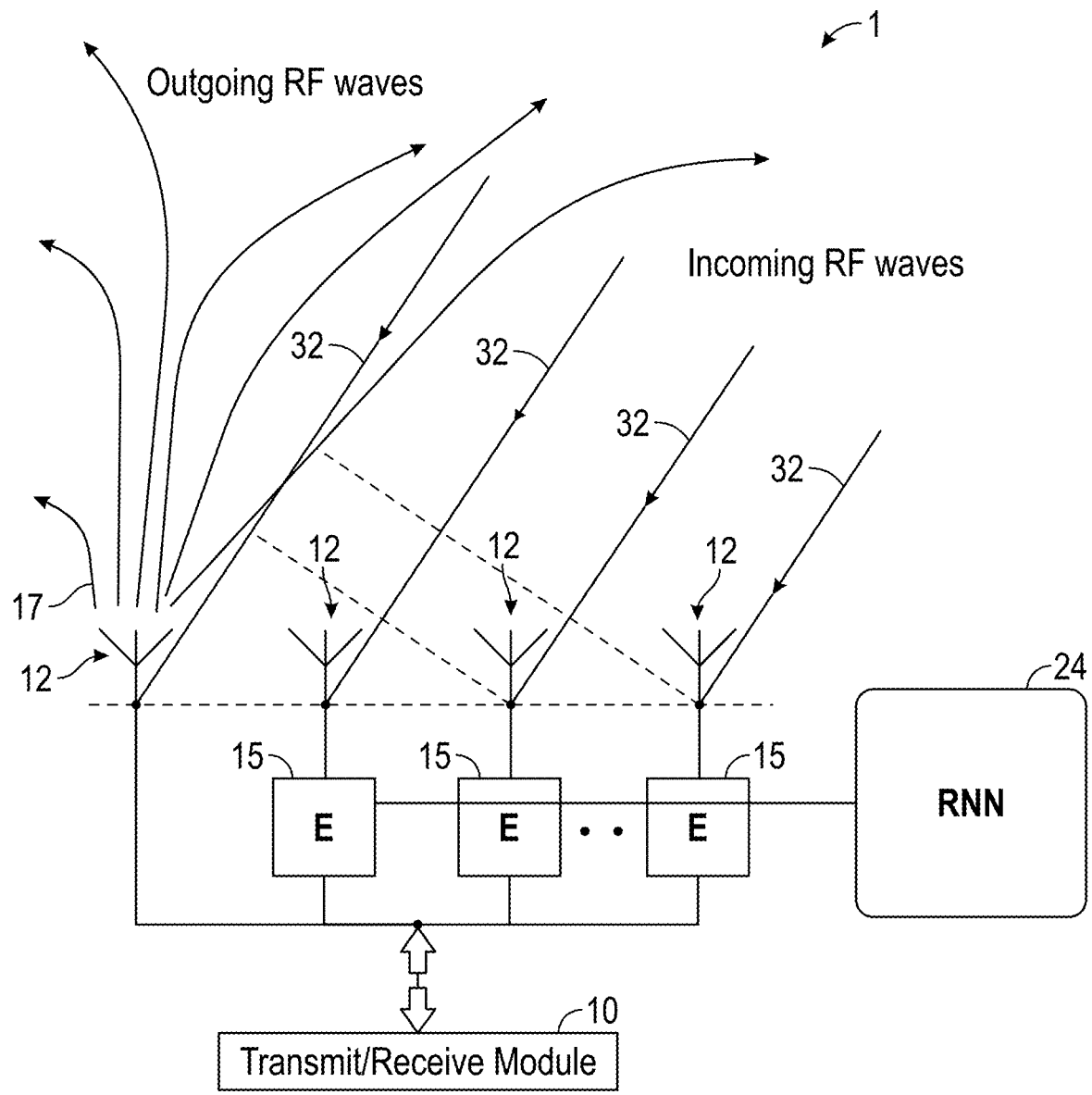
FIG. 6 is schematic of an exemplary embodiment of a multi-planar detection and imaging system in accordance with the present disclosure.

A second transmitter 20 is provided to transmit a carrier radio wave 22, as discussed in more detail herein. At least one end unit transceiver 15 may receive radio wave transmissions 17 and transmit them to the antennas 12. A duplexer 19 enables the transmitters and receivers, which may be operating at different frequencies, to communicate with the same antennas. As best seen in FIG. 5, one or more of the transmitters and/or receivers may act as conversion modules to convert the radio waves (Analog) to Digital Data (Binary) and vice versa as needed.

The antennas 12 transmit radio waves 17 in a wide variety of frequencies in specific directions. In exemplary embodiments, the system 1 includes a computer-controlled array of antennas 12, which creates a comb beam of radio waves 17 that are electronically steered in different directions without moving the antennas 12. These radio wave patterns and frequencies are determined by an RNN 24 in the AI engine 23 and are dynamically changing according to the scanned area topography.

Figure 2:
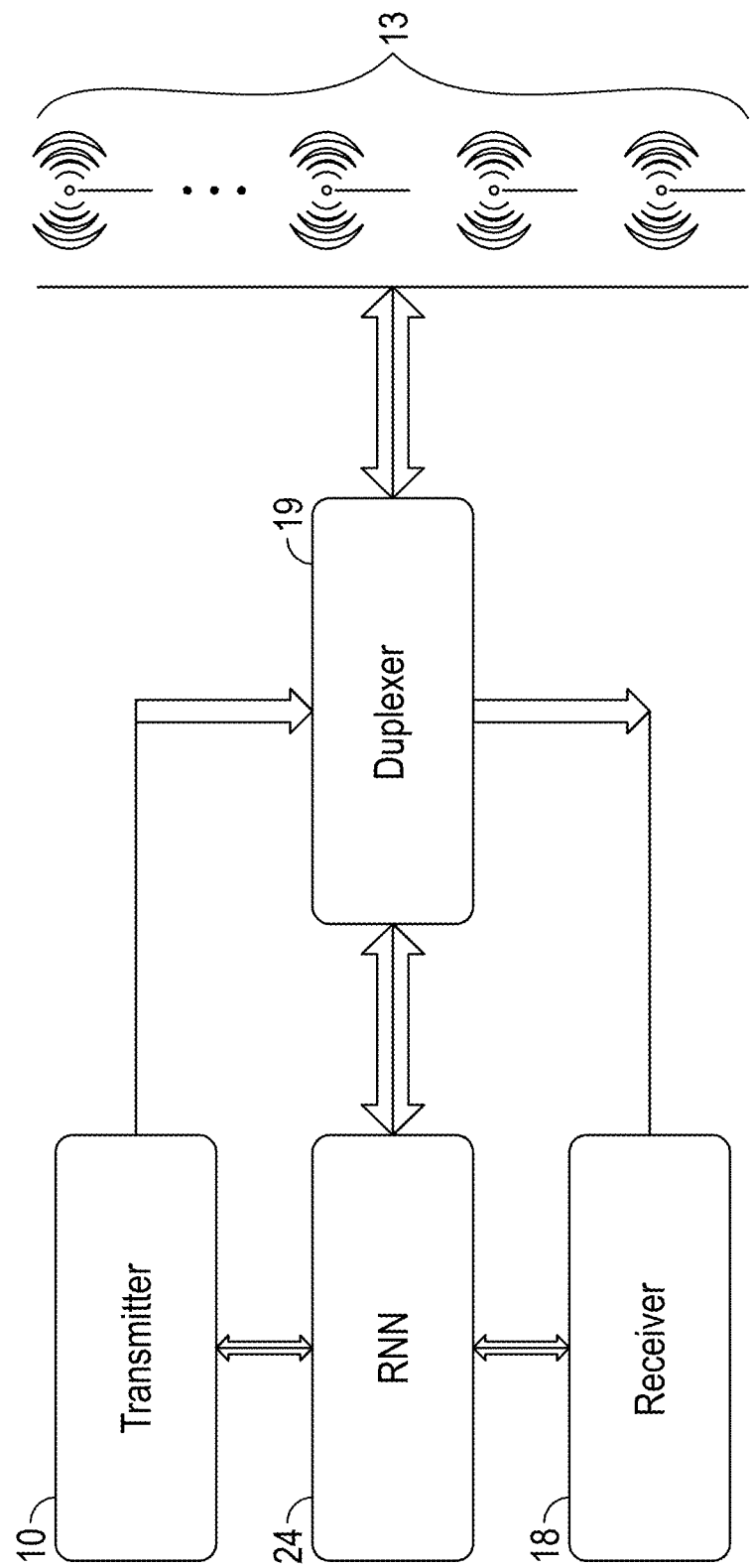
FIG. 2 is a block diagram of an exemplary embodiment of a multi-planar detection and imaging system and method in accordance with the present disclosure.
Figure 3:
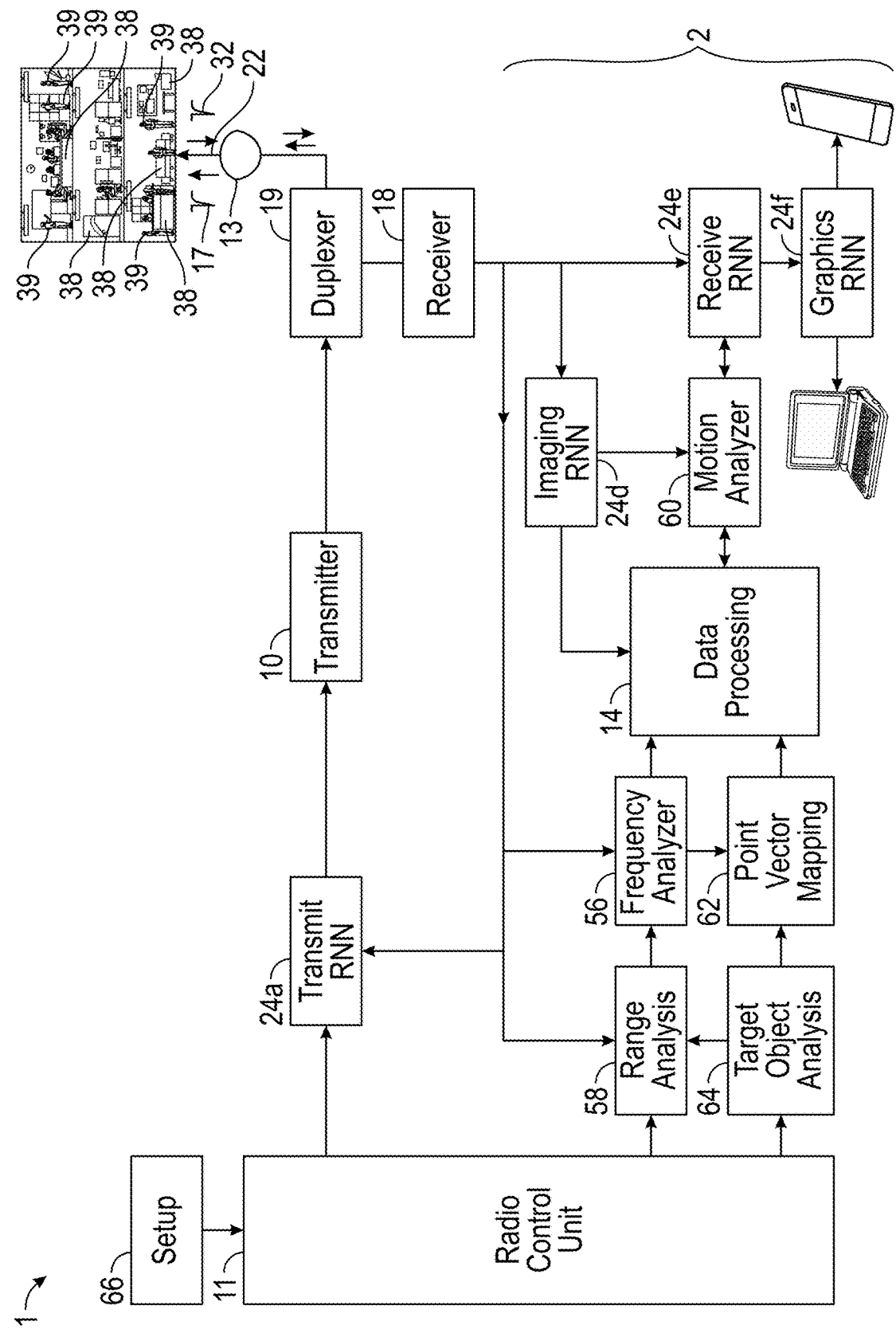
FIG. 3 is a block diagram of an exemplary embodiment of a multi-planar detection and imaging system in accordance with the present disclosure.

It should be noted that multiple RNNs could be provided. As shown in FIG. 2, a second RNN 24b (RNN2) may be provided to define a separate radio wave that is serving as a carrier to guide the scanning radio waves 17 for the direction. A third RNN 24c (RNN3) may control another electronic circuit that controls the carrier radio wave 22 that is guiding the scanning radio waves. Further, as illustrated in FIG. 3, a transmit RNN 24a controlling transmission of radio waves might be a distinct module from an imaging RNN 24d that controls imaging, a receive RNN 24e that receives reflected radio waves, and a graphics RNN 24f that controls the final graphic presentation.

The antenna array 13 does not work on a phase shift principle; instead, in exemplary embodiments, it uses guided pilot radio waves to direct the transmitted patterns. Each individual antenna 12 may transmit based on a different, separated guiding beam. The guiding/carrier radio wave 22 guides each antenna energy into the desired direction. The system 1 may include separate electronic circuitry to create a relationship between the radio waves 17 that are transmitted from the antenna 12 and separate electronics that control the guiding radio wave 22 so the antennas will transmit the waves in the desired directions.

Figure 7:
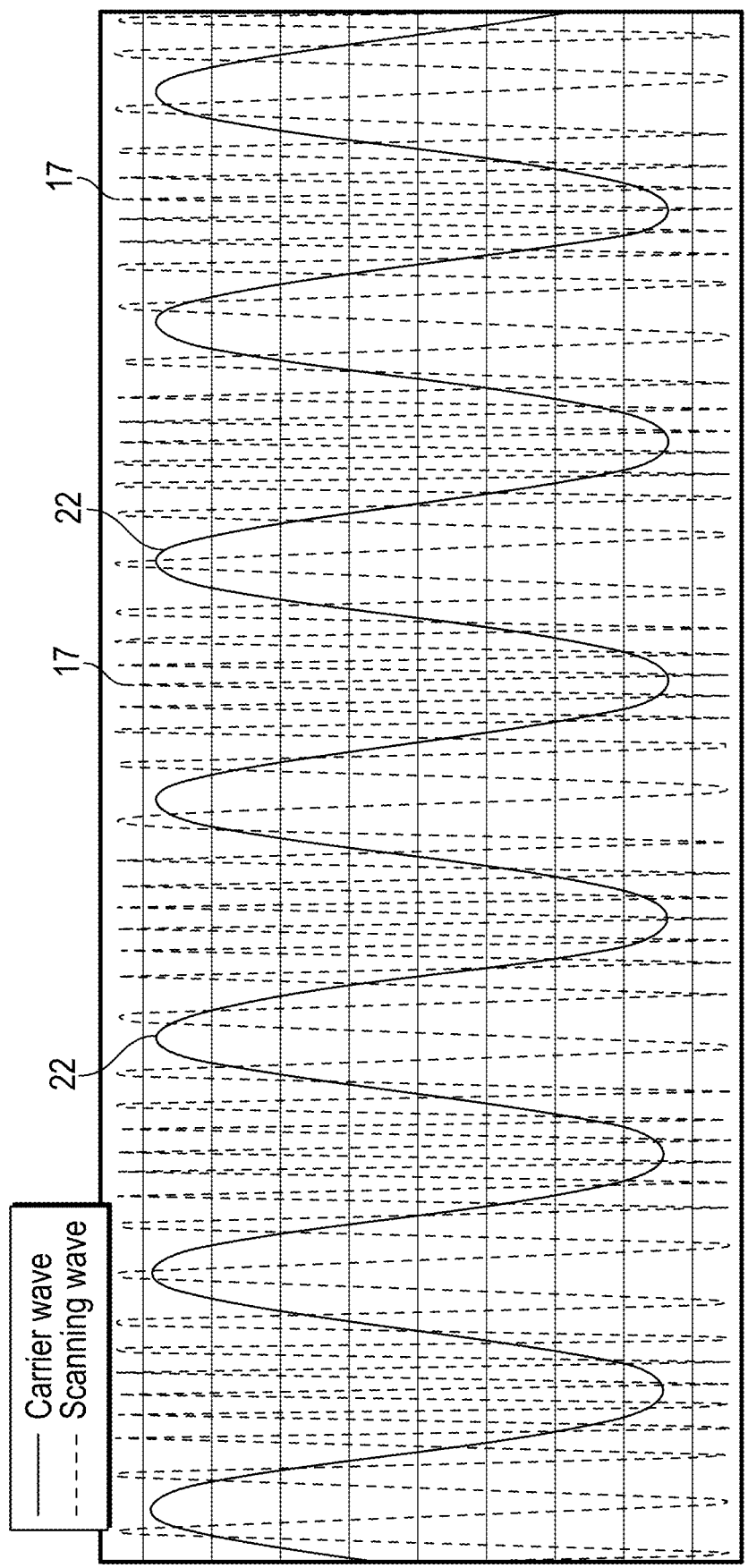
FIG. 7 is a frequency diagram showing an exemplary carrier wave and radio scanning wave in accordance with the present disclosure.

In exemplary embodiments, one or more guiding transmitters 20 electronic circuits provide the direction to each antenna 12 within the array 13, transmitting on its own set of frequencies. These operations are managed by RNN 24. These guiding transmitters 20 work similar to laser beam guidance, that is functioning as a carrier to point direction. The guided antenna arrays work in a sweeping range of frequencies. The guiding radio wave 22 is pulsating and multiplexed within the directed waves, acting as a carrier wave. The carrier radio wave 22 and the scanning radio wave 17 may be synchronized and multiplexed via another electronic circuit. In exemplary embodiments, synchronization modules adjust the guiding waves 22 (the direction pointing waves) with the scanning waves, creating an accurate multi-plane, radio-based scan-and-map function. Using this method, for example, outdoor or indoor scenery can be mapped in nanoseconds time frame. Carrier wave 22 guidance of radio waves 17 is illustrated in FIG. 7.

The system's guided antenna array 13 may be comprised of dynamic guiding arrays. The dynamic guiding array 13 includes transmitter 16/receiver 18 per antenna 12 which is RNN controlled to point the direction for the radio beam steering. The system 1 radiates several beams of radio waves 17 at multiple frequencies in different directions simultaneously. One of the major advantages of the dynamic guided antenna array 13 system is its high degree of reliability/ultra-high-speed scanning and mapping areas of interest. The system distributes frequencies in a pulse form across a wide band of frequencies, which makes it more accurate and less susceptible to noise or hacking. Each transmission pulse is transmitted in a different, random frequency, which makes it virtually impossible to interfere or hack into, enabling high security and privacy. In addition, a scrambling algorithm is added to further increase the security, so the end result is a system that operates as an ambient "white noise" radio wave.

Figure 4:
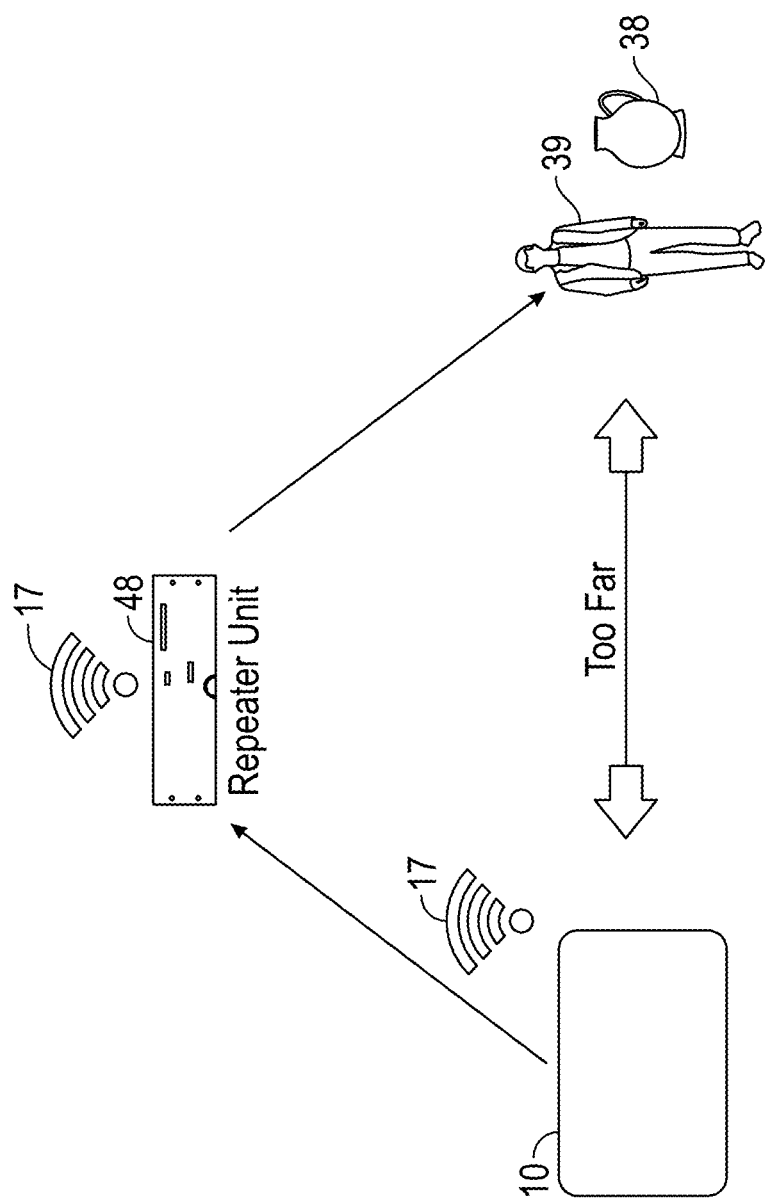
FIG. 4 is a schematic of an exemplary embodiment of a multi-planar detection and imaging system in accordance with the present disclosure.

One or more repeaters 48 could also be provided to enhance operations. Optional sensors (not shown) may be used to extend and increase resolution and achieve additional features, although in exemplary systems the antennas provide these features. As illustrated in FIG. 4, repeaters 48 are configured to extend the range of the radio waves 17 sent by the radio device 10. In exemplary embodiments, the range of the system 1 is at least 500 feet and could cover around 1000 feet as extended by a first repeater 48. With additional repeaters the system can cover a longer range. A long-range system not for home or building use, for example, could be equipped with a much stronger transceiver that can reach many miles, e.g., 30-50 miles. The radio device would be larger with larger antenna designed for outdoor, long range. Such systems can be used as autonomous cars' "eyes" and similar applications.

Figure 8:
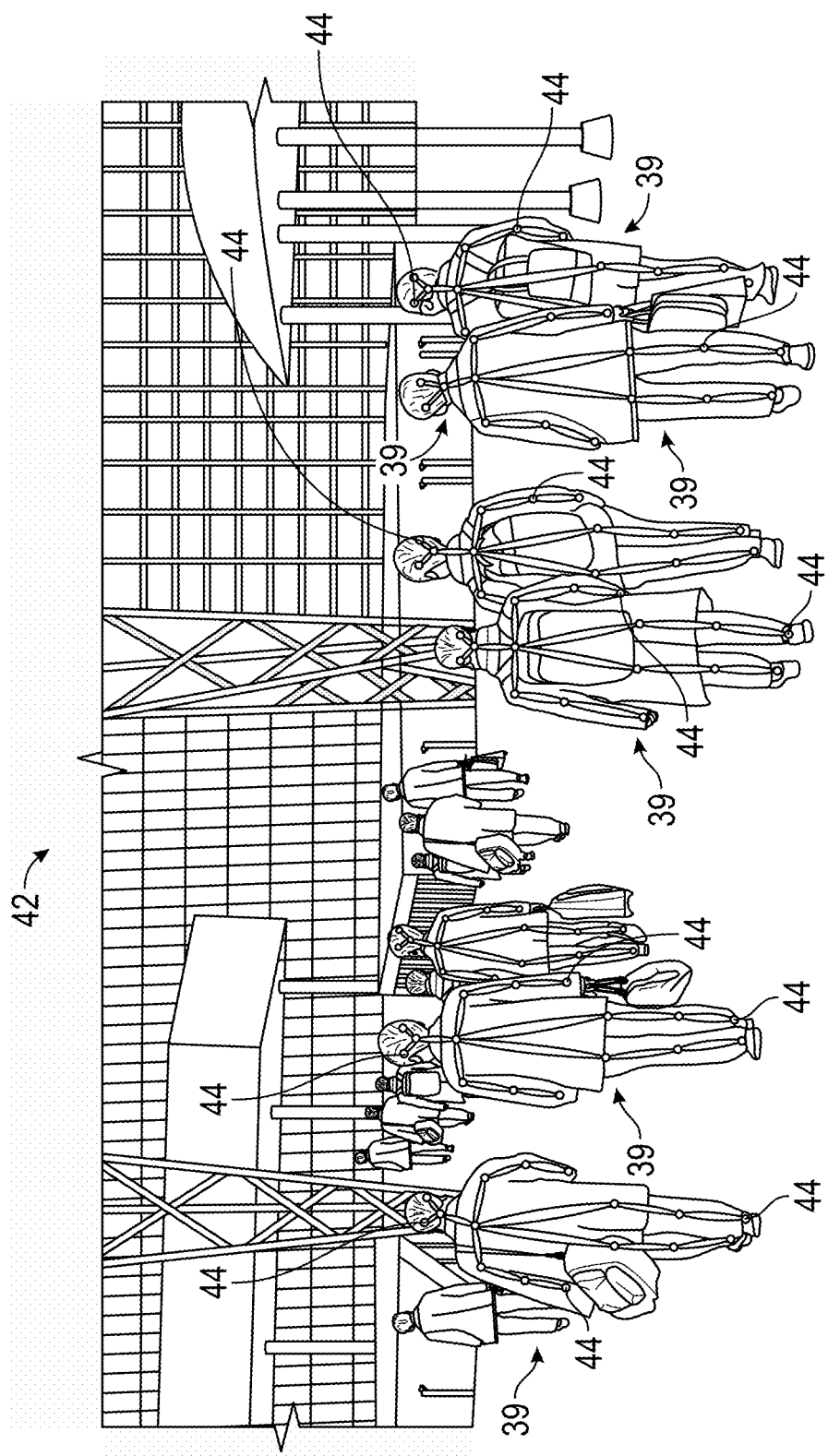
FIG. 8 is a perspective view of an exemplary embodiment of an interest point detector in accordance with the present disclosure.

In exemplary embodiments, the processing system 14 has an artificial intelligence (AI) engine 23 including a recurrent neural network (RNN) 24 in communication with the radio device 10. The transmissions are controlled by RNN 24, which constructs random and specific patterns to receive predictive reflections. The transmitters 16, 20 and receivers 18 capture the reflections and pass them to the RNN 24 for analysis. In exemplary embodiments, the system 1 includes an interest point detector 42, illustrated in FIG. 8, for multi-plane reflection waves data. It analyzes points 44 such as vertices from a reconstructed surface mesh 46 embedded in the 3D data to determine deformations, translations, rotations, and finally identification.

The vast amount of data is processed by the AI engine 23, which includes heuristic-based successive approximation processes. These processes enable the real-time area of interest scanning and accurate mapping and imaging for scenery, objects, and living entities. One or more of the RNNs may include a computer vision and image processing system that analyzes the massive, reflected radio data that is received. In some embodiments, such a system clusters the received data, dividing it into aggregate categories according to the inherent properties of the data. The elements in each aggregate category are analyzed for their characteristics in an unsupervised learning fashion. In exemplary embodiments, an AI-based, backend computer software is running in the background to manage all operations.

Figure 9:
FIG. 9 is a perspective view of an exemplary thermal map in accordance with the present disclosure.

Another set of processes is used to predict the relationship that should exist between reflected data patterns. This link prediction module then provides attributes, building a model to create the object's or living entity's image. The multiplanar detection and imaging system 1, via the AI engine or more particularly, the RNN, constructs a thermal map 28 (FIG. 9) or vectorial point map 30 (FIG. 10) of the scanned area based on the reflected radio waves 32. A thermal map 28 of the scanned area could show living entities as thermal objects with heat zones having correlated colors.

Figure 10:
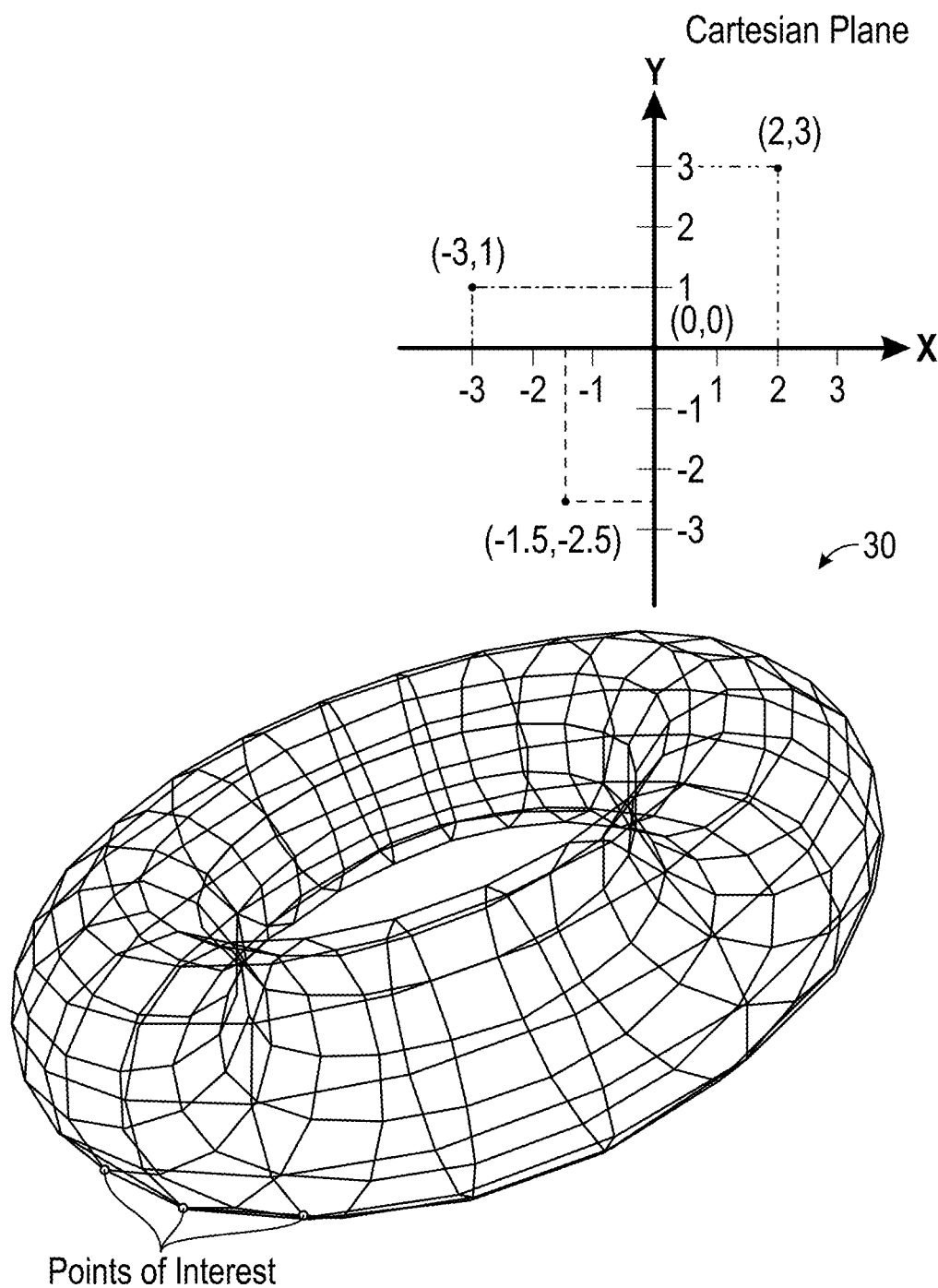
FIG. 10 is a perspective view of an exemplary vectorial map in accordance with the present disclosure.

As best seen in FIG. 10, vectorial point map consists of images defined in terms of points of interest on a Cartesian plane. These points are connected by lines and curves to form polygons and eventually the final object/living entity. The main advantage of using vectorial imaging is that the points, lines, and curves can be scaled up/down to any resolution. The points of interest determine the direction of the vector path; each path may have various properties including values for color, shape, curve, thickness, and fill. Changes in the maps may be shown as video on a computer screen. Embodiments also include web application and mobile applications to present the scanned area map, movements, and position. Both the web application and the mobile app are synchronized.

In operation, the user may have a setup option 66 to provide instructions to the radio control unit 11. The process typically starts with the radio device 10 transmitting wireless signals within multiple planes. The antennas 12 transmit the radio waves 17 in a wide variety of frequencies in specific directions. A frequency analyzer 56 may be provided to assist with assigning frequencies. The radio waves 17 may be transmitted in a few ways: coherent pulsed, continuous-wave, and Frequency Modulated (FM). MESH radio repeaters 48 extend the "visibility" range, as the only range limitation is the repeater's mutual distance. The repeaters 48 may work in a MESH network topology, and processes may include range analysis 58.

Figure 11:
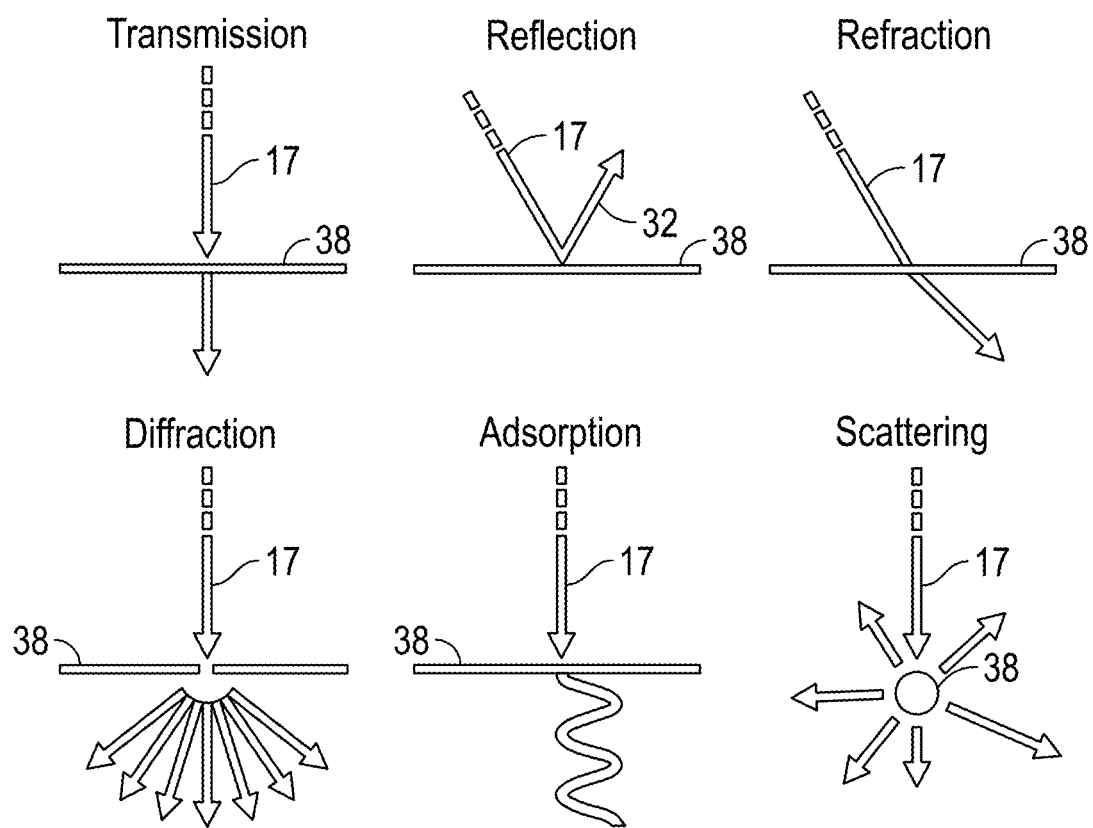
FIG. 11 is a schematic showing the interaction of radio waves with objects and living entities in exemplary methods of real-time position and movement detection and imaging in accordance with the present disclosure.

A carrier radio wave 22, generated by the second transmitter 20, is used to guide each antenna energy into the desired direction. More particularly, the carrier wave 22 includes an information-bearing signal for the purpose of directing the scanning radio waves 17 and may operate in a higher frequency. The electromagnetic radiation propagates through space and is reflected or otherwise altered by objects 38 or living entities 39 within range. As shown in FIG. 11, when the scanning radio waves 17 reach the objects 38, they can be transmitted, reflected, refracted, diffracted, adsorbed, or scattered. Advantageously, disclosed systems and methods consider all these scenarios. The reflections are received by the system's 1 transmitters 16, 20 and receivers 18 and passed to the RNN 24. The vast amount of data is processed by the AI engine 23. An error correction protocol may be provided for the scanned and carrier radios.

Figure 12A:
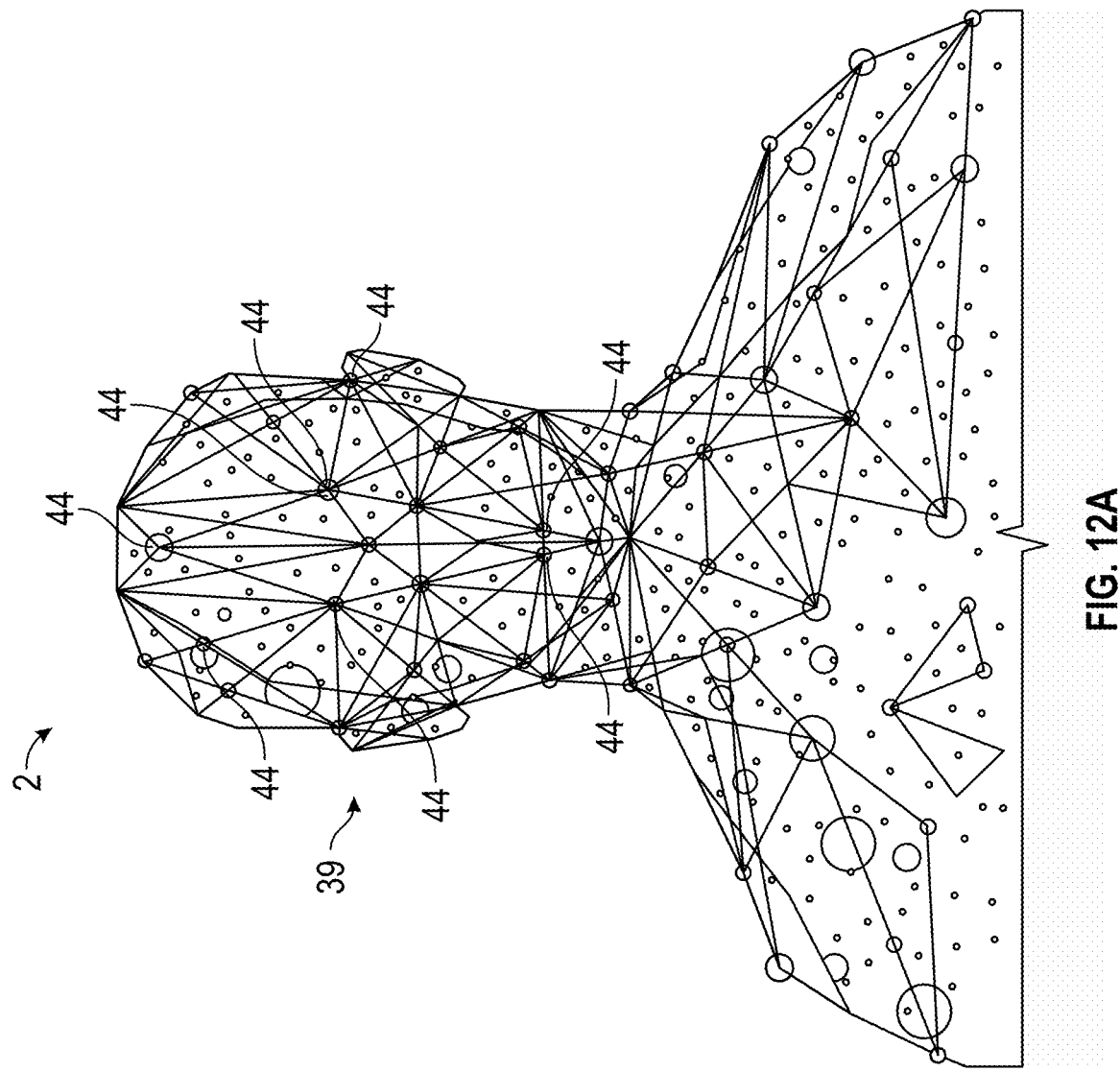
FIG. 12A is a perspective view of an exemplary method of real-time position and movement detection and imaging in accordance with the present disclosure.
Figure 12B:
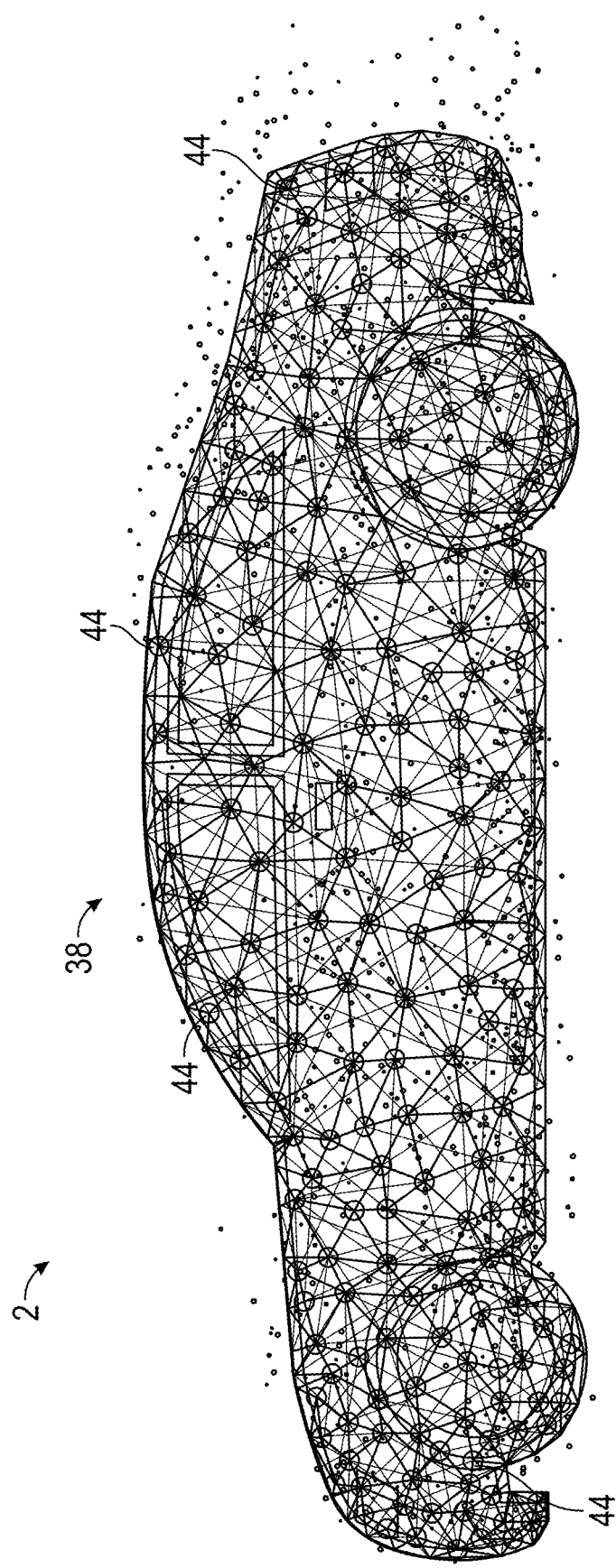
FIG. 12B is a perspective view of an exemplary methods of real-time position and movement detection and imaging in accordance with the present disclosure.

Turning to FIGS. 12A and 12B, an exemplary detection and identification process 2 finds specific, predefined points 44 in the image 36 and computing descriptors for the local features around them. Interest-point detectors 42 identify points 44 in the image for which the signal changes three-dimensionally, that is, at corners, junctions, and vertexes. This method applies to facial features, body parts, objects, scenery, and similar. The radio signals 18 that are received on few planes are converted into shadows and then fed into another set of neural networks to fill the shadows with the objects 38 and living entities 39 (e.g., humans) with their information, creating the entity's complete 2D and 3D image.

Exemplary target object analysis 64 includes computer vision processes applied directly to the given three-dimensional data to develop detectors 42 for locally interesting points 44. Vision-based interest-point detectors 42 may be used on depth images to construct 3D object models 50 in an unsupervised fashion from partial views. Another process considers spectral geometric features 44 on triangular meshes and recognizes pointing gestures using stereotypical vision. The imaging RNN 24d produces colored areas of interest to identify the location of the face and body features using computer vision techniques known to those of skill in the art. The same process may include a depth evaluator 52 to determine the final shape of objects 38 and living entities 39.

The multi-planar detection and imaging system 1 receives the radio data and assigns an orientation to each extracted interest point 44 according to pre-trained information for the entity's detection. The radio data may be converted to binary data, which is read before vectorial point mapping 62 is done and a vectorial point map 30 constructed. Concurrently, the system marks the entity's vertices corresponding to the points of interest 44 and defines if the entity is an object 38 or a living thing 39. The vertex's edges are followed to neighbor vertices until a maximal geodesic distance of a point to a point is reached. The system then vectorizes the entity's 3D orientation and creates an on-the-fly local image depth. Finally, the image is normalized by bringing the main features of each class to a close alignment, which in turn, enables the image's machine learning and classification.

Figure 13:
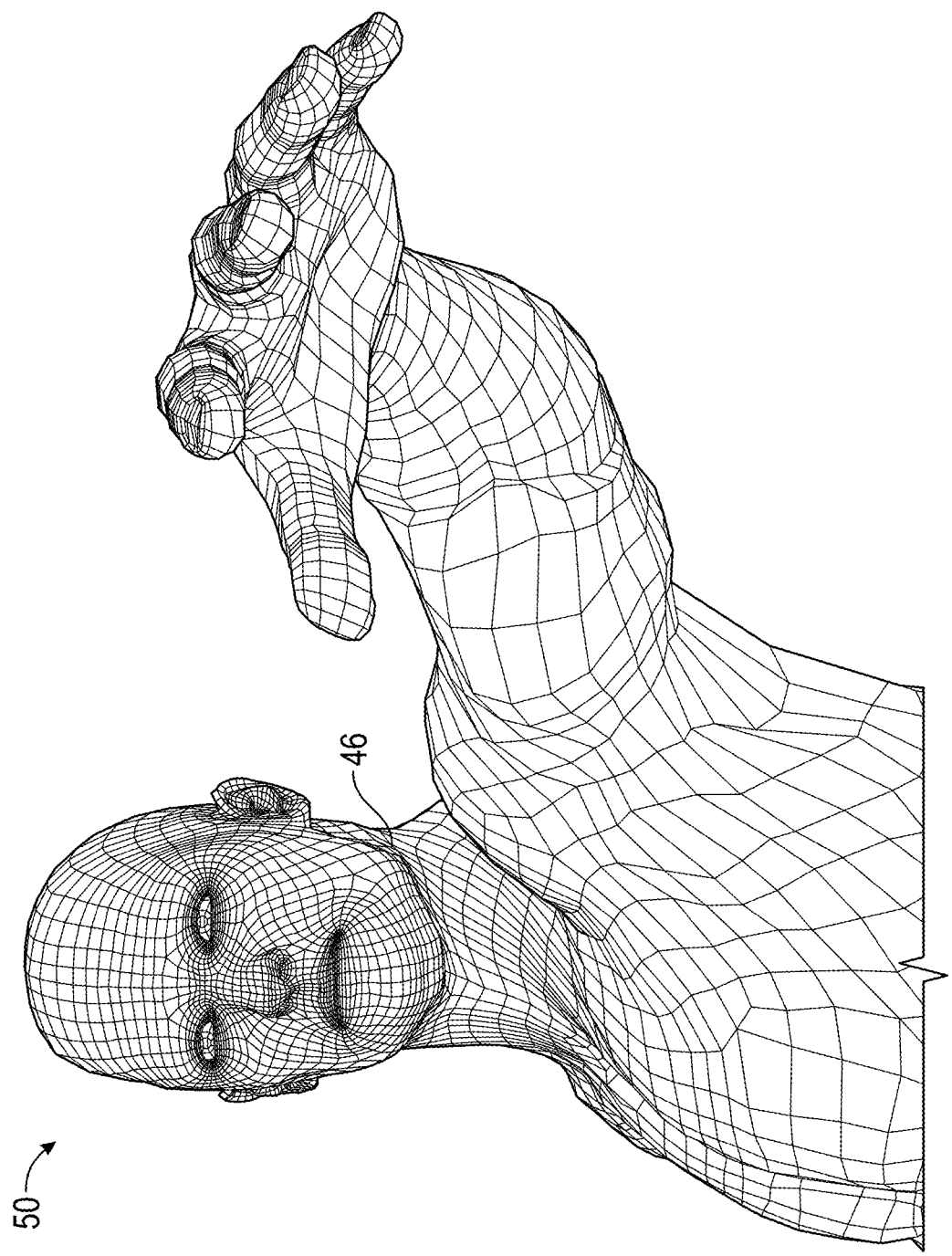
FIG. 13 is a perspective view of an exemplary method of real-time position and movement detection and imaging in accordance with the present disclosure showing an exemplary mesh.

The entity's detection algorithm presented is executed for all subsets of connected meshes 46, shown in FIG. 13, and, thus, can deal with situations in which a mesh 46 falls into several parts, due to occlusions in the depth image. As a result, additional interest points 44 are found at the occlusion boundaries. The radio transmitter 16/receiver 18 sends radio waves 17 in a pre-planned method, predicting points of interest 44 to a uniform distribution over the in-range area, and it grows incrementally until it eventually contains all the scanned area's points.

For example, for identifying human body parts, the order in which the points of interest 44 are detected corresponds to their importance. That is, points close to the hands, feet, and head are found first before other surface points are added to the set. Another example is car identification. First, the car's body and wheels are identified, then the rest of the car's features. Regarding object detection, orientation estimations are first produced, and then the analysis is done to normalize local shape descriptors by their characteristics and relative orientation. This operation leads to identify the point's properties and, thus, to their classification.

Figure 14:
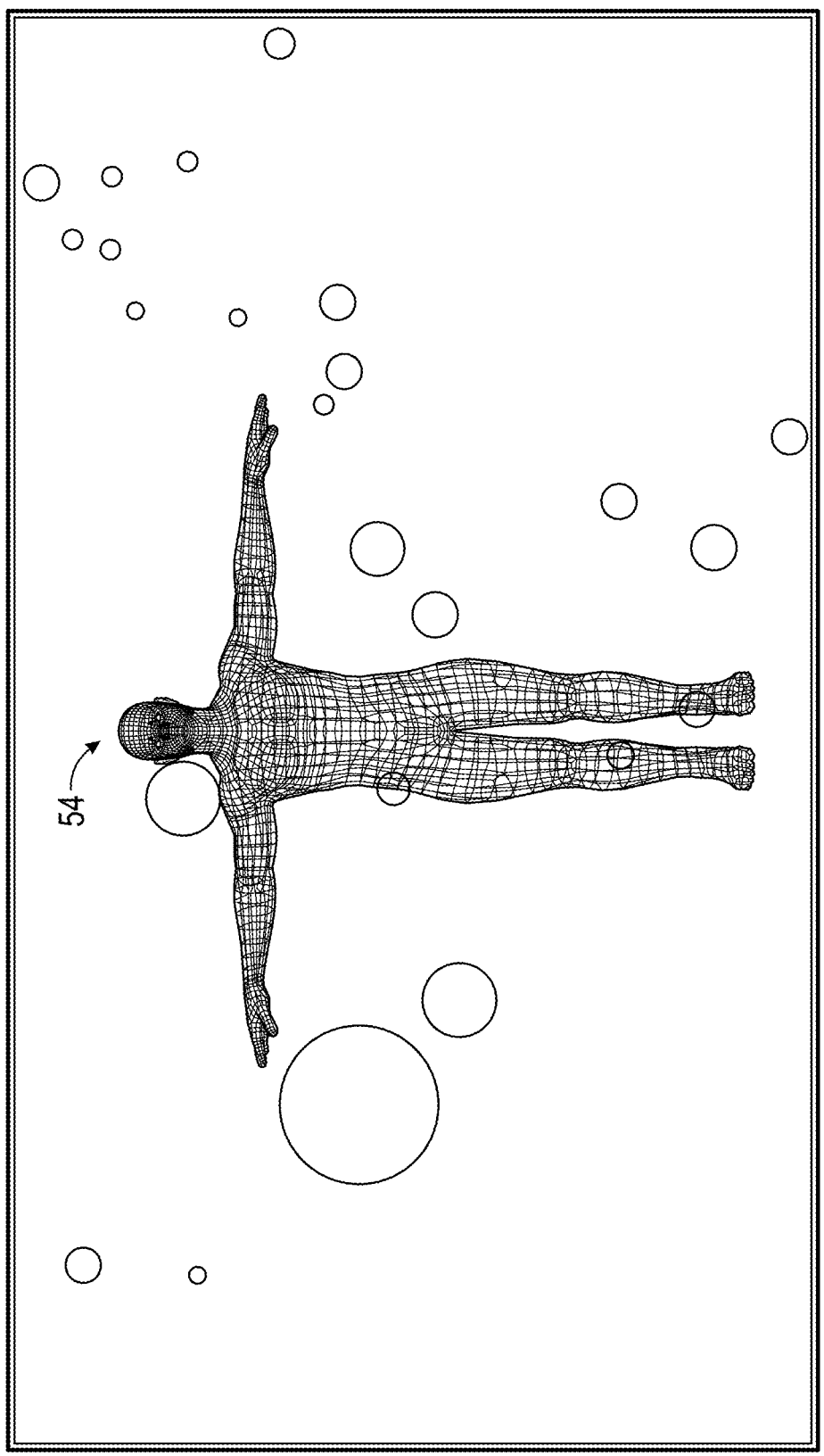
FIG. 14 is a perspective view of an exemplary method of real-time position and movement detection and imaging in accordance with the present disclosure showing an exemplary holographic image.

In exemplary embodiments, the reflected radio radiation provides training data for the RNN 24 by simultaneously marking findings with an active marker-based motion capture analyzer 60, identifying points, and space within a scanned area. This analysis system consists of several radio transmitters 16/receivers 18 that produce virtual markers placed on parts that are in the interest of detection. The reflected wave data is encoded, categorized, and assigned unique identifications per category. The output of the motion capture system is two-dimensional and/or three-dimensional data which includes the location of distinct markers within micron accuracy. The motion capture analyzer 60 registers the information on its coordinates array to create depth-based marker locations. Then it computes the transformation of the coordinate array creating a holographic image 54 including depth, dimensions, and sizes, as shown in FIG. 14.

Due to its dynamic scanning capabilities, the multi-planar detection and imaging system 1 can map areas accurately and in real-time. Objects 38 and living entities 39 can be rapidly detected, including real-time movement. The system can detect multiple objects 38 and/or living entities 39 within the scanned area. Exemplary processes include automatically correlating between the on-going received radio reflected data and the updated scanned area point map enabling real-time computer vision of objects 38 and living entities 39. A 3D holographic image can be presented on a computer screen for outdoor and indoor environments.

House rooms or an entire building can be mapped quickly as objects (e.g., furniture, TVs, and similar), and living entities (e.g., humans, animals, and similar) can be identified and tracked live. Using triangulation and radio mapping, the system 1 learns about each object or living entity's physical location within a scanned area. The range can be extended using wireless repeaters and boosters. The same system works underground, underwater, in-air, and outer space, creating radio beams for mapping and movement detection. Another useful application is autonomous vehicles. As discussed in more detail herein, the system provides a real-time scan-and-map operation, enabling "seeing" a vehicle's surroundings, and therefore can quickly react to situations.

Advantageously, transmitting/receiving the radio information in a wide variety of frequencies enables the detection of tiny changes within living entities. This opens a whole world of possibilities to detect human's vitals, like a heartbeat, breathing, movement, and more. For example, a human's movement or fall can be detected. Another example is that a human in stress condition can be detected due to a faster heartbeat. An irregular heartbeat can be detected and initiate an emergency alert. Furthermore, using the same technology, SPO2 and blood sugar can be detected, scanning a living entity's body, and performing sets of measurements. An RNN is trained to detect specific patterns and identify a medical condition or health emergency. The system can also detect hazardous materials like explosives, chemicals, and any health risk-oriented substance.

Disclosed systems and methods can also be used for a wide range of medical applications. With miniaturization they can "see" inside humans' veins, detecting clogs and artery blockages, including total occlusions. It can "see" through curved arteries and tiny veins as an external device, providing a non-invasive medical device to check cardio-vascular potential risks. Another example is the detection of tumors and foreign objects within a human's body, including measurements of the foreign body size, shape, and material.

Another application is a guiding imaging technology for surgeries covering simple and complex areas imaging in real-time.

Figure 15:
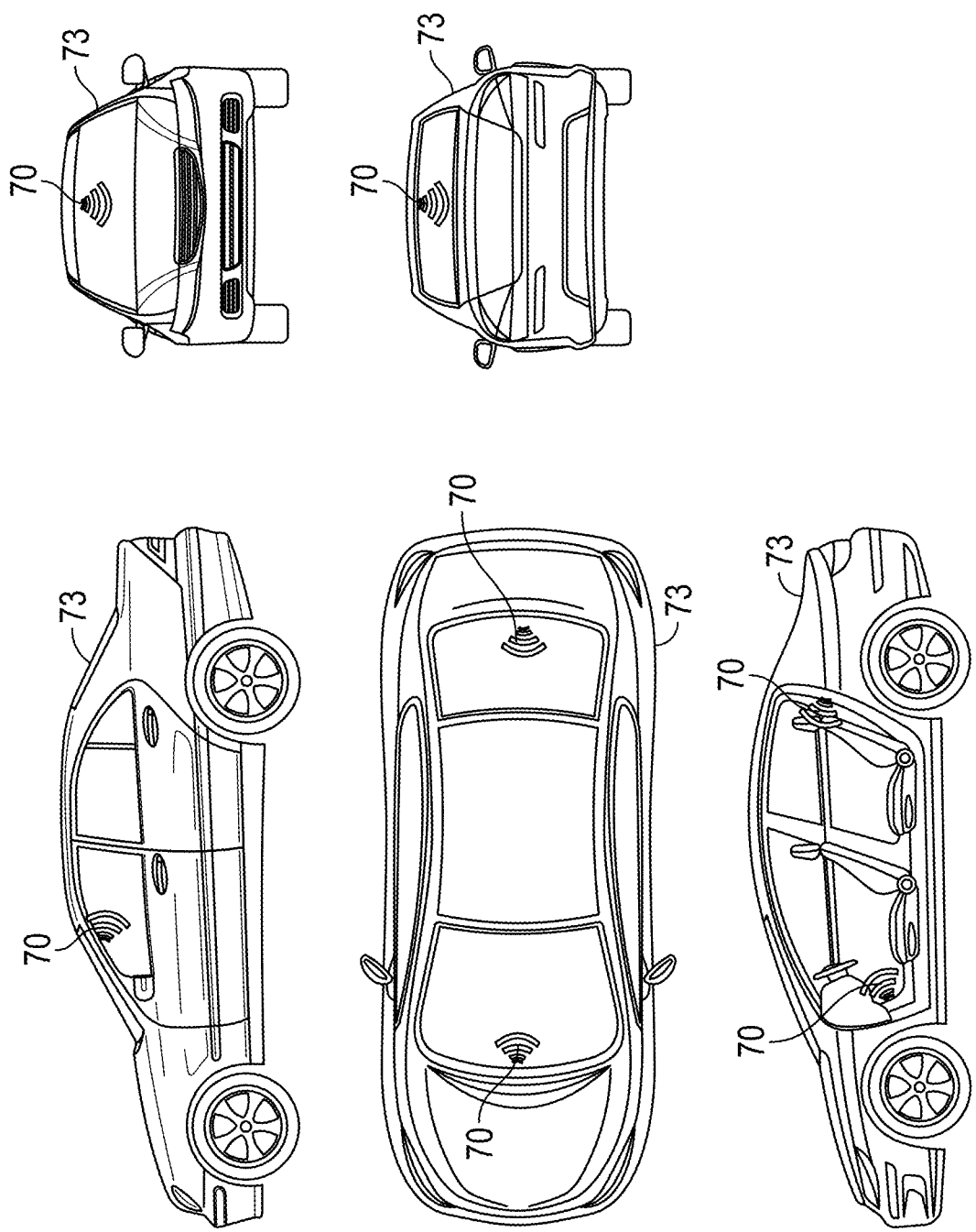
FIG. 15 shows multiple views of locations of an exemplary vehicle monitoring system in accordance with the present disclosure.
Figure 16:
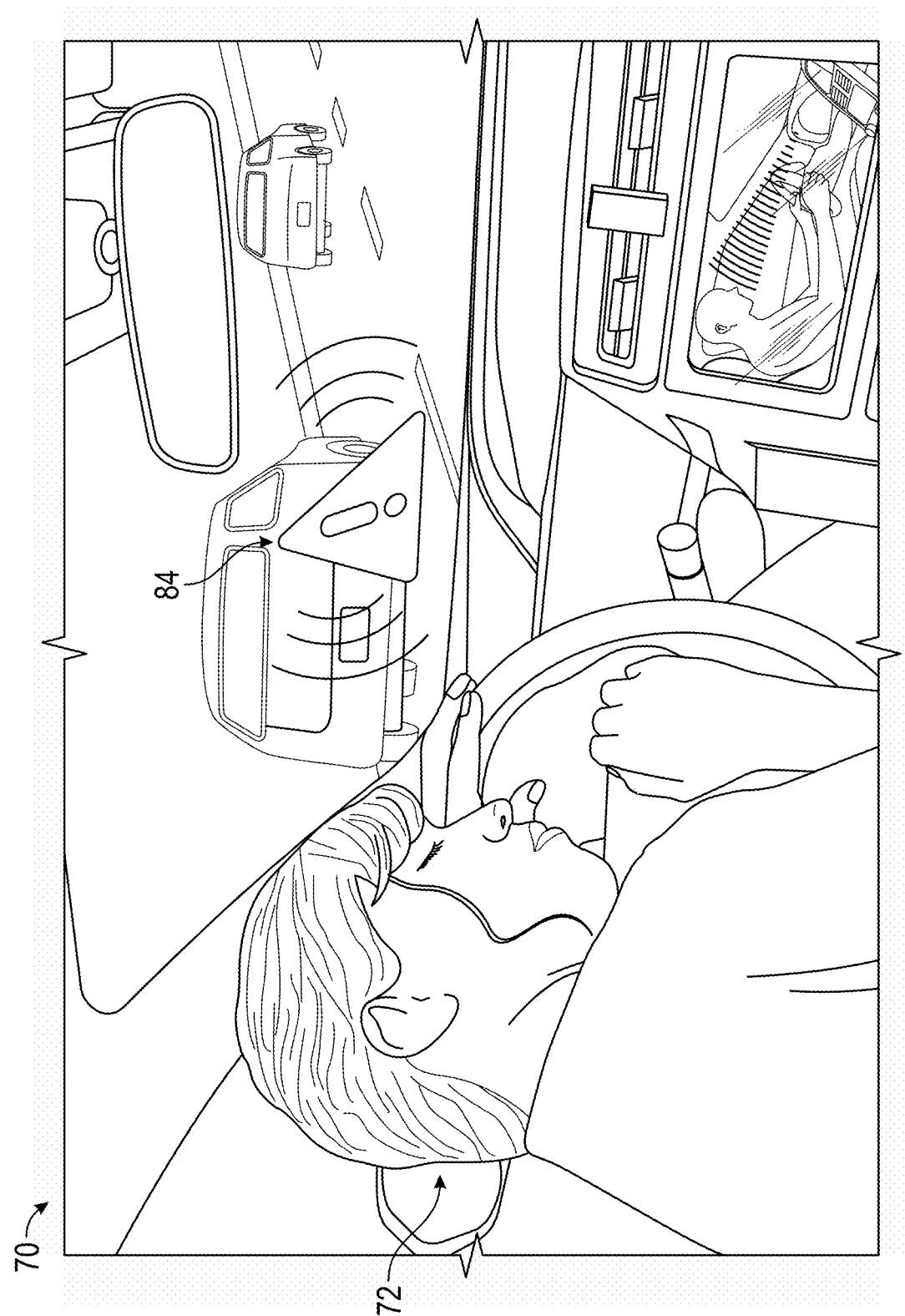
FIG. 16 is a perspective view of an exemplary embodiment of a vehicle monitoring system in accordance with the present disclosure.
Figure 17:
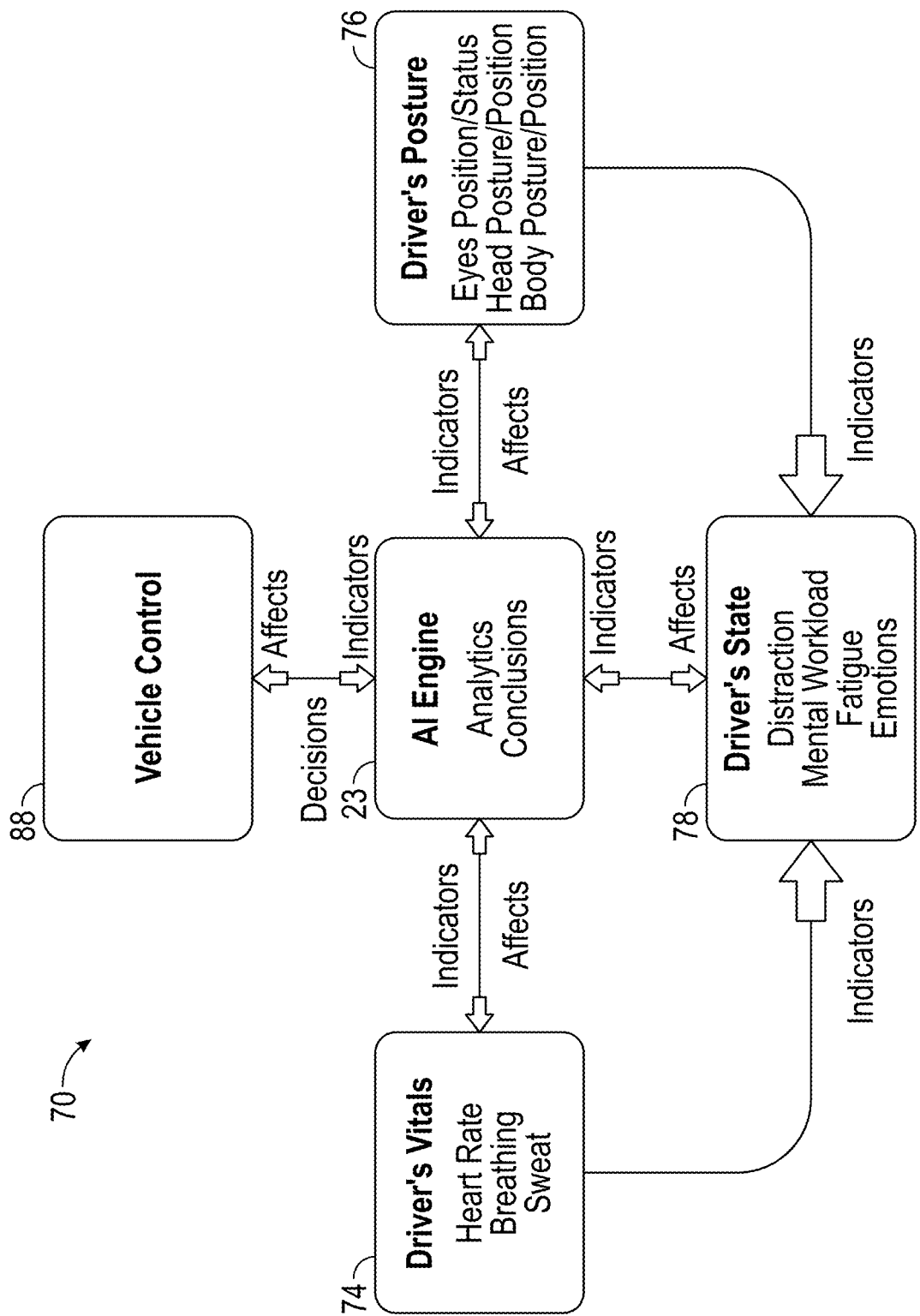
FIG. 17 is a process flow diagram of an exemplary embodiment of a vehicle monitoring system in accordance with the present disclosure.
Figure 18:
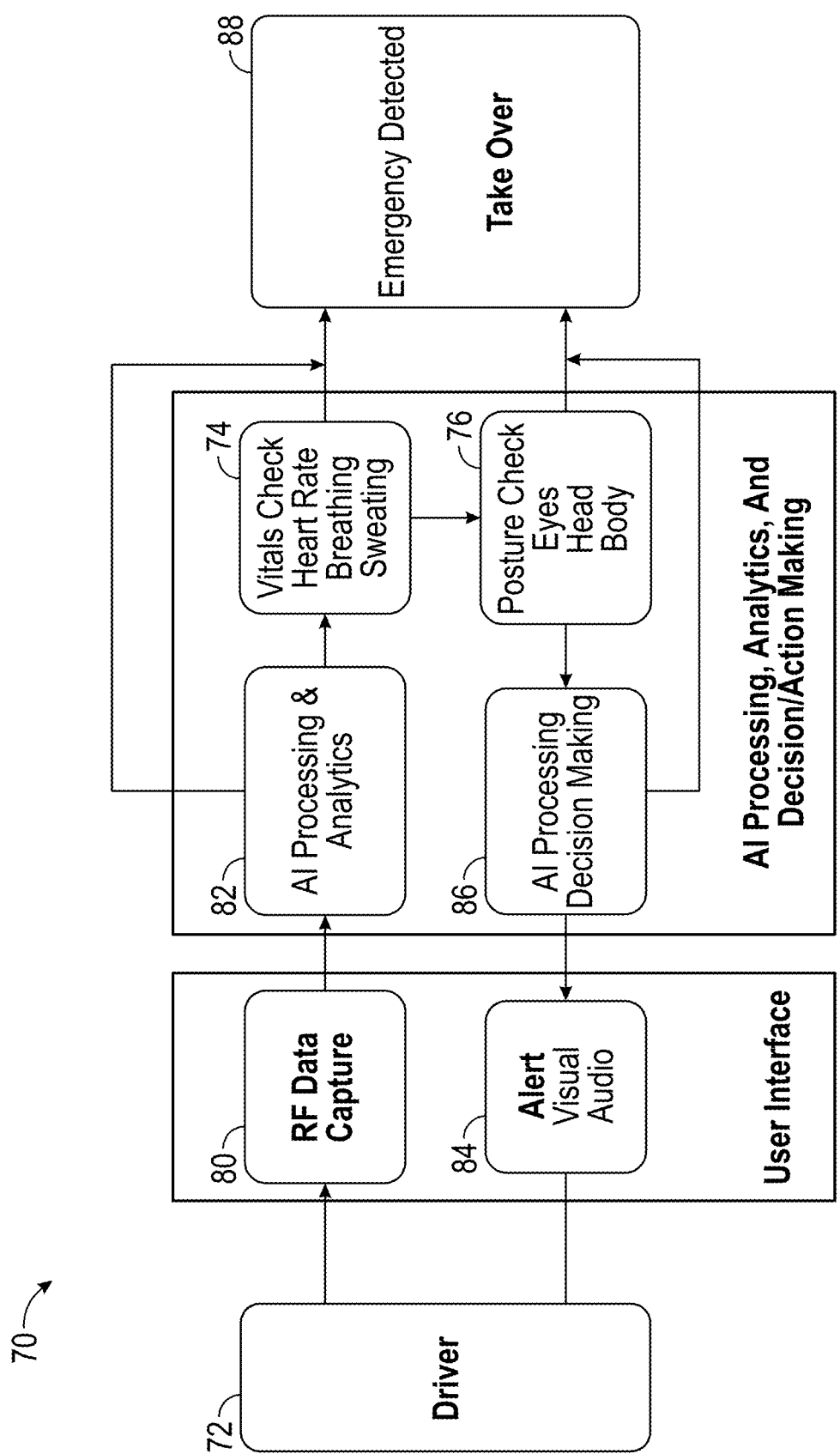
FIG. 18 is a process flow diagram of an exemplary embodiment of a vehicle monitoring system in accordance with the present disclosure.
Figure 19:
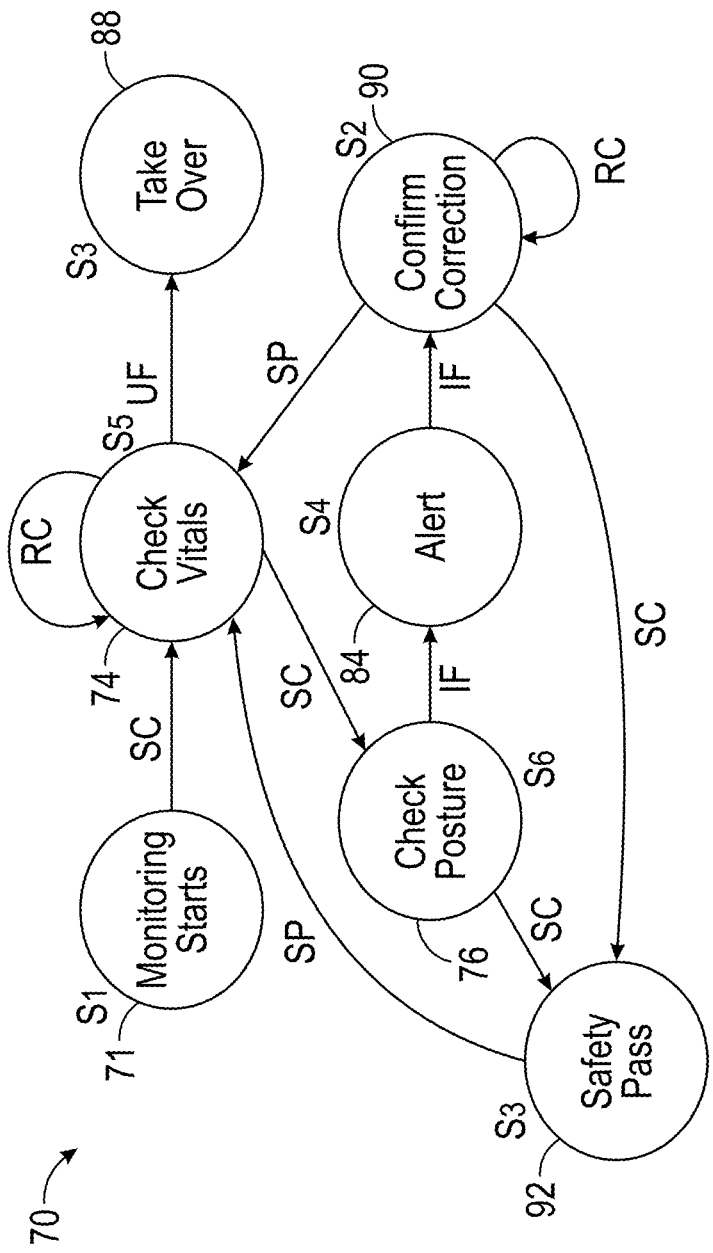
FIG. 19 is a process flow diagram of an exemplary embodiment of a vehicle monitoring system in accordance with the present disclosure.

Referring to FIGS. 15-19, systems described herein also could be installed within vehicles to serve as a driver status monitoring system 70. As illustrated in FIG. 15, the monitoring system 70 could be located in various parts of the vehicle 73. When monitoring starts 71, the system 70 measures the vital signs 74 of the driver 72, including but not limited to heart rate, breathing, and low blood pressure. Disclosed systems could detect the driver's emotional state 78 like stress, anxiety and similar, sleepiness level, or falling asleep. The driver losing control of the vehicle for any reason could be detected. Through radio waves reflections the AI software performs RF data capture 80, collecting information about the driver's heart rate, breathing rhythm, and other information to create a baseline of a driver's normal state, attentiveness, and state of mind in normal circumstances. The system 70 also performs a posture check 76, including analyzing the driver's face, eye position, pupils, head, and body position to "see" the driver's face, posture, physical and mental status, day and night. It can determine if the driver's eyes are closed, open, or blink even if the driver is wearing dark sunglasses.

Through AI processing and analytics 82, the system 70 can then make several determinations about the physical and emotional state of the driver. For instance, it can determine whether the driver is blinking more than usual, narrowing or closing eyes, and whether the head is tilting at an odd angle. It can also determine whether the driver is looking at the road ahead, and whether the driver is actually paying attention or just absent-mindedly staring. In case of abnormalities the system 70 will make a decision 86 to provide an alert 84 via audible and visual (blinking lights, etc.) means to get the driver's attention. For example, if the system 70 determines that the driver is distracted or drowsy, it could attempt to get the driver's attention by issuing audio alerts 84, lighting up a visual indicator on the dashboard, or vibrating the seat.

The system then checks 90 if the driver has corrected the deficiency and operation of the vehicle. If so, the system determines that the driver has achieved a safety pass 92 and the vehicle is operating safely. If no driver response is achieved the system 70 will evaluate taking control 88 of the vehicle and stopping it for safety purposes. If the system 70 determines that there is a collision/accident risk, the system could automatically apply the brakes or take control 88 of the vehicle. Thus, when any of the above conditions is detected, the systems could provide an alert and/or take control of the vehicle (e.g., stop on the side of the road) to avoid accidents. Advantageously, the system 70 can monitor the driver and passengers for vitals, make conclusions, provide alerts, or take action.

Because the radio waves can "see" through objects, and with the AI analytics can identify objects and humans within the car's cabin, the system could also identify concealed objects of interest (e.g, weapons) in the passenger's possession and alert the driver or the authorities. But the most important of all is the system's constant monitoring for safety by watching the driver's physical and mental conditions. Similarly, disclosed systems and methods can be used for aircraft and marine vessel control.

Another possible application is to identify road and weather conditions and perform on-the-fly personalized vehicle settings, for example, automatically adjusting the mirrors or headlights or comfort features (Air Conditioning, Anti-Fog, etc.) to maintain immediate assistance for the driver.

Another possible application of disclosed systems and methods is a security system to detect living or robotic intruders. More applications can be ocean's bottom research, submarine navigation system, air traffic radar and navigation, space exploration, and similar. Another possible application is computer vision for autonomous vehicles of all types. The system could provide AI-based computer vision for aircraft, ground-based vehicles, marine autonomous vessels, and similar.

Thus, it is seen that systems and methods of real-time position and movement detection, multi-planar detection, and imaging are provided. It should be understood that any of the foregoing configurations and specialized components or connections may be interchangeably used with any of the systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the present disclosure.

What is claimed is:

1. A multi-planar detection and imaging system comprising:
    a radio device including at least one receiver and a first transmitter transmitting radio waves in multiple planes;
    at least one antenna transmitting the radio waves in multiple frequencies;
    a second transmitter transmitting a carrier radio wave guiding the radio waves such that the radio waves identify points of interest in an object or living entity and reflect back to the radio device; and
    a processing system in communication with the radio device;
    wherein the receiver receives the reflected radio waves;
    wherein the processing system analyzes the points of interest including marking vertices corresponding to the points of interest, following edges of the vertices to neighbor vertices, and vectorizing the object's or living entity's 3D orientation; and
    wherein the processing system constructs an image of the object or living entity.

2. The system of claim 1 wherein the image is a holographic image or a computer image.

3. The system of claim 1 further comprising an AI engine including a recurrent neural network in communication with the radio device, the recurrent neural network controlling transmission of the radio waves.

4. The system of claim 3 wherein the recurrent neural network controls transmission of the carrier radio wave.

5. The system of claim 1 further comprising at least one repeater configured to extend a range of the radio waves.

6. The system of claim 1 wherein the processing system includes an AI engine configured to predict relationships between the points of interest.

7. The system of claim 6 wherein the AI engine maps the object or living entity and constructs an image of the object or living entity.

8. The system of claim 1 wherein the processing system detects changes in organs of the living entity.

9. The system of claim 8 wherein the processing system measures one or more vital signs of the living entity.

10. The system of claim 1 wherein the system is configured to be installed in a vehicle being controlled by a driver and is configured to take control of the vehicle if the system detects changes in one or more vital signs of the driver or emotional state of the driver or that the driver is falling asleep.

11. A multi-planar detection and imaging system comprising:
  a radio device including at least one receiver and a first transmitter transmitting radio waves in multiple planes;
  an AI engine including a recurrent neural network in communication with the radio device, the recurrent neural network controlling transmission of the radio waves;
  at least one antenna transmitting the radio waves in multiple frequencies; and
  a second transmitter transmitting a carrier radio wave guiding the radio waves such that the radio waves scan an area, identify points of interest in an object or living entity, and reflect back to the radio device;
  wherein the AI engine includes an interest point detector analyzing the points of interest, assigning an orientation to one or more of the points of interest, and marking vertices corresponding to the points of interest; and
  wherein the AI engine predicts relationships between the points of interest, converts the vertices into shadows, and fills in the shadows to construct an image of the object or living entity.

12. The system of claim 11 wherein the AI engine marks vertices corresponding to the points of interest and determines whether the points of interest are in an object or a living entity.

13. The system of claim 11 wherein the interest point detector is vision-based.

14. The system of claim 11 wherein the AI engine constructs a vectorial point map of the scanned area based on the reflected radio waves.

15. The system of claim 14 further comprising a computer screen, wherein the system identifies dynamic changes in the vectorial point map and presents the dynamic changes as video of the scanned area on the computer screen.

16. The system of claim 11 wherein the recurrent neural network constructs a thermal map of the scanned area.

17. A method of real-time position and movement detection and imaging, comprising:
  transmitting radio waves in multiple planes and in multiple frequencies from a source to an area to be scanned;
  transmitting a carrier radio wave steering the radio waves such that the radio waves scan an area, identify points of interest in an object or living entity in the scanned area including marking vertices corresponding to the points of interest, and reflect back to the source;
  analyzing the points of interest, including following edges of the vertices to neighbor vertices and vectorizing the object's or living entity's 3D orientation, and predicting relationships between the points of interest;
  constructing a vectorial point map of the scanned area; and
  constructing an image of the object or living entity.

18. The method of claim 17 further comprising detects changes in organs of the living entity and measuring one or more vital signs of the living entity.

19. The method of claim 17 further comprising identifying dynamic changes in the vectorial point map and presenting the dynamic changes as video of the scanned area on a computer screen.

20. The method of claim 17 wherein the image of the object or living entity is constructed by converting the vertices into shadows and filling in the shadows.

* * * * *